(12) United States Patent
Delcroix (10) Patent No.: US 7,641,168 B2
(45) Date of Patent: Jan. 5, 2010

(54) MOULD FOR ALUMINOTHERMIC WELDING OF RAILWAY RAILS, AT LEAST ONE OF WHICH IS WORN

(75) Inventor: Frédéric Delcroix, Hellesmes (FR)

(73) Assignee: Railtech International, Raismes (FR)

( * ) Notice: Subject to any disclaimer, the term of this patent is extended or adjusted under 35 U.S.C. 154(b) by 437 days.

(21) Appl. No.: 11/805,106

(22) Filed: May 22, 2007

(65) Prior Publication Data

US 2007/0272114 A1 Nov. 29, 2007

(30) Foreign Application Priority Data

May 29, 2006 (FR) .................................. 06 04750

(51) Int. Cl.
*B23K 23/00* (2006.01)
(52) U.S. Cl. .......................................... 249/86; 164/54
(58) Field of Classification Search .................. 249/86; 164/53, 54

See application file for complete search history.

(56) References Cited

U.S. PATENT DOCUMENTS 3,113,359 A 12/1963 Burke
3,495,801 A * 2/1970 Kruger ......................... 164/54
6,227,282 B1 * 5/2001 Kuster et al. ................... 164/54
6,793,003 B2 * 9/2004 Triantopoulos et al. ....... 249/86

FOREIGN PATENT DOCUMENTS

EP 0 802 013 10/1997
FR 2 396 620 2/1979

* cited by examiner

*Primary Examiner*—Yogendra Gupta
*Assistant Examiner*—Thu Khanh T Nguyen
(74) *Attorney, Agent, or Firm*—Blakely, Sokoloff, Taylor & Zafman LLP (57) ABSTRACT

This present invention concerns a mold for the aluminothermic welding of railway rails. The compressible lining (58) used to seal the molding die in relation to leakages of the weld metal in the liquid state is limited to the parts of the contact surfaces (52) of the parts (19) of the mold on the rails to be welded, corresponding to the bottom, the sides and the top of the foot, to the sides of the web and below the head. The rigid refractory material of the parts (19) is exposed in the parts (67, 71) of the contact surfaces corresponding to the sides and the top of the head, and suitable to be removed selectively from the latter. This makes it easy to adapt the mold to rails with different degrees of wear.

10 Claims, 7 Drawing Sheets

FIG_1

FIG. 2

FIG_5

FIG_3

FIG_7

FIG_8

FIG. 9

MOULD FOR ALUMINOTHERMIC WELDING OF RAILWAY RAILS, AT LEAST ONE OF WHICH IS WORN

This present invention concerns a mould for the aluminothermic welding of railway rails that are aligned with each other longitudinally, of the type that includes several parts in rigid refractory material that are suitable to be assembled temporarily around two transverse rail end-pieces for welding, which together form:

a moulding die, open upwards, arranged to receive poured welding metal in the liquid state and enveloping the two end-pieces, a space created between them and a first zone of each rail, immediately adjacent to the corresponding end-piece, in order to communicate a given shape to the weld metal as its solidifies, two continuous surfaces arranged to make contact with a second zone of each rail immediately adjacent to the first zone of the latter, opposite to the corresponding end in relation to this first zone, and carrying an attached compressible lining to render waterproof the said contact in relation to the weld metal in the liquid state.

A mould of this type has been used successfully by the Applicant for several decades, in a method of implementation in which its parts, created in bonded sand in order to facilitate its destruction after one single use, are chiefly three in number, namely:

two approximately identical top mould halves, which constitute the specular image of each other in relation to a mean longitudinal plane common to the two rails to be assembled and respectively enveloping, on one side of these two rails, zones of the latter and of the space created between them which correspond to the top of the foot, the web, the bottom, the sides and the top of the head, and a lower or bottom part, in the general shape of a plate which completes the two upper parts below the foot of the rails and below the corresponding zone of the space created between them.

These three parts are held together, around the rails to be assembled, by means of a metal chassis, which is re-usable.

At the time of its appearance, the mould thus created represented a big step forward, by allowing, due to the presence of the compressible sealing lining, in practice a refractory felt attached by means of a refractory adhesive to the whole of the contact surfaces, so as to easily achieve sealing of the die in relation to passage of the weld metal in the liquid state, by limiting in most cases the need to resort to luting, for this purpose, to a simple additional precaution.

By virtue of the compressibility of the sealing lining and a suitably chosen geometry of the contact surfaces, such a seal is achieved between each surface and the second zone of the corresponding rail not only when the latter is new, but also when the latter has a certain degree of wear on its head, namely generally as long as the latter has not lost more than three millimeters by wear in the direction of the height, whether this wear concerns the two rails to be welded or just one of them.

In this regard, it will be remembered that when two rails with different degrees of wear are welded together, such as a new rail and a rail that has already been used, or two rails that have already been used but that have different degrees of wear, care is necessary to align the tops of the heads, constituting the running surface of the railway vehicles, by mutually offsetting the respective feet in the direction of the height and, correlatively, the webs and tops of respective heads, where the term "head" should be interpreted here in the broad sense that includes any broadened shape of the upper part of a railway rail, whether it be a rail of "Vignoles" profile or similar or of a girder rail.

On the other hand, if the wear on the head of at least one of the rails is more pronounced, the compressible sealing lining is no longer capable of compensating, and then use is generally made of moulds of an older type, whose contact surfaces do not have a compressible sealing lining and for which sealing in relation to the rails is achieved exclusively by luting, with the resulting drawbacks in terms of the time necessary for the suitable sealing of a mould in relation to the rails to be welded, in terms of safety in relation to the leakages of weld metal in the liquid state and in terms of the appearance quality at the edges of the weld.

The aim of this present invention is to remedy these drawbacks by proposing a mould of the type indicated in the preamble, which should be suitable to be adapted to rails with more pronounced wear, while retaining the advantages of the presence of a compressible sealing lining in order to effect sealing of the contact surfaces in relation to the rails.

To this end, this present invention proposes a mould of the type indicated in the preamble, characterised in that the said compressible lining is limited to the parts of each contact surface corresponding to the bottom, the sides and the top of a foot of the corresponding rail, to the sides of a web of the corresponding rail and below a head of the corresponding rail, in that the said rigid refractory material is directly exposed in parts of each contact surface corresponding to the sides and the top of the head of the corresponding rail, in that each contact surface, between its part corresponding to the top of the head of the corresponding rail and the said compressible lining of its corresponding part under the head of the corresponding rail, at the maximum compressed state with reference to the normal conditions of use, has a spacing which is less than the spacing (h) between the top and the bottom of the head of a new rail, and in that the said rigid refractory material is chosen or treated in order to facilitate its selective removal at least in the parts of each contact surface corresponding to the top of the head of the corresponding rail and thus allow adaptation of the mould to the rails whose head is worn, with continuous contact of the said contact surface at the bottom, the sides and the top of the foot of the two rails, at the sides of the web of the two rails and at the bottom, the sides and the top of the head of the two rails.

Naturally, in a mould according to the invention, just as in a mould of the type indicated in the preamble, such as that currently used by the Applicant, the rigid refractory material constituting the different parts of the mould can advantageously be created from a bonded sand, and the sealing lining made from a felt of refractory fibres linked by a refractory binder, affixed to the component parts of the mould by means of a refractory adhesive.

A professional engineer will easily understand that from the moment that one has appropriately dimensioned the spacing between the part of each contact surface corresponding to the top of the head of the corresponding rail and the compressible lining of its corresponding part under the head of the corresponding rail, with reference to a maximum state of compression of this lining in normal conditions of use, one can easily, by removing, for a chosen thickness, the material constituting the mould, from one or each of the parts of the contact surfaces corresponding to the top of the head of the rails, closely adapt this spacing to the dimensions that the head of each rail displays between its top and its bottom, and over a considerably greater range of possibilities than in the moulds of the same type used up to the present by the Applicant.

It can certainly be seen that the parts of the contact surfaces corresponding to the top of the head of the rails and to the sides of this head, that is to the parts of the rails intended to come into contact with the wheels of the railway vehicles in order to support and guide them, then no longer have a compressible sealing lining, meaning that it can be sealed in relation to the rails only by means of a luting paste, which does indeed provide a seal but forms a less precise contour than a compressible lining for the weld metal as it solidifies. This remains without consequence however, since, in any case, there is still provided, at the top and the sides of the heads of the rails, an excess of weld metal, which is later machined so as to align the weld with the rails, thus also filing down any possible burrs of weld metal, in order to provide the rolling and guidance of the wheels with the required regularity, with the aim of reducing wear and noise, as well as providing a comfortable ride.

The selective removal of the rigid refractory material constituting the mould, at the part of the contact surfaces corresponding to the top of the head of the rails, can easily be achieved by abrasion, with a file for example, especially if this material is a bonded sand, in a manner which is well known in itself.

This removal process can also be facilitated if, according to a preferred method of implementation of the mould according to the invention, the latter presents a localized slimming down of each contact surface in its part corresponding to the top of the head of the corresponding rail. Moreover, in order to allow maximum control over the thickness of rigid refractory material thus removed, measured from the part of the contact surface corresponding to the top of the head of the corresponding rail, one can advantageously arrange that the mould according to the invention includes selective removal markers along the parts of each contact surface corresponding to the top of the head of the corresponding rail.

It is possible to combine these two advantageous arrangements, in a particularly simple manner, by arranging that the said selective removal markers are composed of steps in the said localised slimmed down part.

As will easily be understand by a professional engineer, a mould according to the invention can easily be adapted, with creation of the required seals in relation to passage of the weld metal in the liquid state, on rails whose heads are considerably more worn than is compatible with the moulds of the type indicated in the preamble, and as currently used by the Applicant, with preservation of the advantages linked to the presence of a compressible sealing lining on the contact surfaces. It is thus possible to weld together, without difficulty, by means of a mould according to the invention, rails whose head presents a degree of wear of up to 15 millimeters, in the direction of the height, which constitutes the maximum currently allowed for reasons of safety, on the understanding that it is possible to design a mould according to the invention that is suitable to be adapted to rails whose head may be even more worn.

The presence of the compressible sealing lining on the parts of the two contact surfaces other than their parts corresponding to the sides and the top of the head of the rails, allow one to compensate without difficulty for a slight wear difference between the heads of the two rails to be welded, such as, for example, a wear difference of up to about three millimeters in thickness, even if, according to a first method of implementation of a mould according to the invention, the two contact surfaces are mutually symmetrical in relation to a plane that is intended to coincide at least approximately with a transverse plane of symmetry between the two rail end-pieces.

Such a method of implementation of a mould according to the invention can be used whenever the wear difference between the heads of the two rails to be welded together is sufficiently small to enable it to be compensated for by a difference of compression of the compressible sealing lining of the contact surfaces of the mould against the rails, and with no loss of sealing capacity. It is considered here that wear is low or high according to whether it can be compensated for or not respectively, without loss of the seal, by a difference of compression in the compressible sealing lining.

It is also possible however to arrange for a second method of implementation of a mould according to the invention that lends itself to greater differences of wear between the heads of the two rails, such as, for example, differences of wear of between three and seven millimeters, which is too high to be compatible with a mould with the symmetry that is characteristic of the aforementioned first method of implementation.

To this end, this second method of implementation of a mould according to the invention is characterised in that the parts of the two contact surfaces corresponding to the top and to the sides of the head of the rails are mutually symmetrical in relation to a plane that is intended to coincide at least approximately with a mean transverse plane of symmetry between the two rail end-pieces, and in that the parts of the contact surfaces corresponding to the bottom, the sides and the top of the foot, to the sides of the web, and under the head, respectively on either side of the said plane, are mutually asymmetrical in relation to the latter, by a difference of spacing in relation to the part of the respective contact surface corresponding to the top of the head of the corresponding rail.

Thus, a mould according to the invention allows one to retain the advantages of the compressible sealing lining on the parts of the contact surfaces which correspond to the bottom, the sides and the top of the foot, as well as to the sides of the web and under the head, that is to the parts of the rails and of the weld that never come into contact with the wheels of the railway vehicles and in which the weld can therefore retain the raw appearance which was conferred upon it by the moulding die, and losing these advantages only in the parts of the contact surfaces corresponding to the sides and the top of the head, that is to the parts of the rails and of the weld which will then be machined in any case, so as to guarantee the welding of rails that are not only badly worn but which also present a significant difference in wear.

In practice, the number of moulds that one must have in order to cope with all the situations that can arise when one has to weld two rails, can be limited to three, namely a mould of the type currently used by the Applicant, if the wear on the rails is low and less than three millimeters, for example, in the direction of the height, and two moulds according to the invention, according respectively to the first and the second of the aforementioned methods of implementation, if the wear is greater, within the limit of 15 millimeters in the direction of the height for example, and in which the wear difference on the two rails in the direction of the height is low, less than 3 millimeters for example, or high, between 3 and 7 millimeters for example, where these values are given only by way of non-limiting examples.

In addition to the arrangements that are characteristic of this present invention, a mould according to the invention can also include any known design and, in particular, in a mould according to the invention such as in a mould of prior art, in a currently preferred manner:

the said parts that make up the mould can advantageously include two parts intended to be placed respectively on either side of each rail, mutually symmetrical in relation to a plane that is intended to coincide at least approximately with a respective mean longitudinal plane of symmetry of the two rail end-pieces, and constituting respective parts of the said surfaces corresponding to the sides and the top of the foot of the rails, to the sides of the web, and to the bottom, and the sides and the top of the head of the rails, and the said parts can advantageously also include a third part, intended to be placed below each rail and constituting parts of the said corresponding surfaces under the foot of the rails.

It is naturally these parts that respectively present the symmetry or the asymmetry corresponding to the first and second aforementioned methods of implementation of a mould according to the invention.

These parts can also present any known arrangement, such as arrangements relating to specification of a pouring channel for the weld metal in the liquid state into the die, opening firstly upwards at a top face of the mould and secondly downwards into a top part of the die, and/or at least one pipe for returning the gas and weld metal in the liquid state, opening firstly upwards at the said top face of the mould and secondly downwards into a bottom zone of the die as well as, where appropriate, laterally at an intermediate level of the latter, corresponding to the level of the head of the rails.

Other characteristics and advantages of a mould according to the invention will emerge from the description that follows, relating to two non-limiting examples of implementation, as well as the appended drawings which accompany this description.

We consider here, as the reference of longitudinality, a direction 1 that the two rails 2 mutually assembled by welding present at least in the immediate proximity of the end-pieces 3, that they present toward each other at this end, and which form between them, as is well known in itself, a continuous space 4, of determined longitudinal value, intended to be filled in by a weld metal supplied in the liquid state, by aluminothermic reaction inside a crucible 5 whose nature is optional in the context of this present invention but which, for example, can be of the type marketed by the Applicant under the title of a "disposable crucible", intended for single use and placed, for example, directly on the mould 6 according to the invention, in a manner which is well known in itself and described in European patent 0407240 to which reference will be made in this regard.

In the two methods of implementation which have been illustrated and will now be described, the mould 6 according to the invention is designed for the mutual welding of rails 2 of the "Vignole" type, presenting a respective symmetry in relation to a longitudinal plane 7 which coincides with section plane II-II, at least in a localised manner in the neighborhood of the end-pieces 3, but it is also intended that it should be possible, in accordance with this present invention, to create moulds that are intended for the welding of other types of rails, and girder rails for example, intended to be embedded in a roadway, and a professional engineer will be capable, without difficulty, of executing, according to the arrangements that are about to be described, the modifications to be made to the mould 6 which will be described, in order to apply it to the welding of various other types of rails.

It is recalled that a rail of the "Vignoles" type has three longitudinal parts that are respectively symmetrical in relation to plane 7 and created as a single part, as follows:

a plane foot 8 with a general orientation that is perpendicular to plane 7, bounded by a lower or bottom plane 9 that cuts plane 7 perpendicularly by two flat edges 10 that are approximately parallel to plane 7 and mutually symmetrical in relation to the latter, and by two concave upper or top half-faces 11, that are mutually symmetrical in relation to plane 7 and each connected to the bottom 9 of the foot by one edge 10 respectively, a flat web 12 positioned on plane 7, above the foot 8, and bounded respectively on either side of plane 7 by approximately flat lateral faces 13, approximately parallel to plane 7 and mutually symmetrical in relation to the latter, each of these faces 13 connecting downwards to a half-top or top face 11 respectively of the foot 8, and a head 14 of approximately rectangular oblong section, perpendicular to plane 7 and formed by two concave lower or bottom half-faces 15, mutually symmetrical in relation to plane 7 and to each of which one of the lateral faces 13 of the web 12 is connected upwards, by a slightly convex plane upper or top face 16, cutting plane 7 approximately perpendicularly to the latter and constituting a running surface for railway vehicles, and by two approximately plane edges 17, approximately parallel to plane 7 and mutually symmetrical in relation to the latter, with each of these edges 17 connecting face 16 to one of the lower or bottom half-faces 15, respectively.

The notions of top and bottom here refer to a service position of the rails 2, in which plane 7 presents an approximately vertical orientation and which constitutes the orientation in which the weld is executed.

The detail of the cross section of such a rail 2 is well known in itself to person skilled in the art, and will therefore not be described further here.

It will be remarked that the wear on the two rails, with the passage of the trains over the years, concerns essentially the upper or top face 16 of the head 14, whose dimension or height h, measured perpendicularly to the lower face 9 under the feet 8, between the intersection of the upper or top face 16 of the head 14 for example and a connecting edge between each edge 17 of the latter and the corresponding lower or bottom half-face 14 thus progressively reduces, but which at least approximately retains its symmetry in relation to plane 7.

In view of their mutual welding together, also in a manner that is known in itself, the end-pieces 3 of the two rails 2 are leveled, by chainsaw for example, so that they are flat and perpendicular to plane 7, and placed face to face, in a mutually parallel relationship and, if the heights h are identical for the two rails 2, in a manner that is not illustrated, and mutually symmetrical in relation to a transverse plane 18 which coincides with section plane I-I, observing the aforementioned space 4, into which one pours the weld metal in the liquid state, originating from the crucible 5, before leaving this weld metal to solidify in order to form the weld. If the heights h are different, for example because of a different wear of the two rails 2, one of which can be new and the other worn, or both of which can come from different origins of previous use, as has been illustrated, this mutual parallel relationship is preserved as is the identity of position of the two end-pieces 3 in relation to the plane 18, but their mutual symmetry is preserved only at the level of the upper or top face 16 of the heads 14, the upper or top faces 16 of which are aligned longitudinally, while the lower half-faces 15 of the heads 14, the webs 12 and the feet 8 are mutually offset, in the direction of the height, by the difference Δh between the respective heights h.

The mould 6, in a manner that is known in itself, has the role of retaining the metal thus poured while it is still in the liquid state, and of shaping it, in a specified manner while it is solidifying.

Also in a manner that is known in itself, this mould 6 is composed, in its two illustrated methods of implementation, of three main parts, namely in particular of two parts or upper halves 19, that are approximately identical, respectively approximately symmetrical in relation to plane 18, and mutually symmetrical in relation to plane 7, along which they are mutually joined by a flat face 20 that is respectively above the head 14 of the rails 2 and of the corresponding part of the space 14, while each of them presents, below this face 20, toward plane 7, a face respectively 21 shaped in a manner that will be detailed below, so as to envelop each of the two rails in the neighbourhood of the end-pieces 3, and the space 4 in zones corresponding to the faces, half-faces or edges 16, 17, 15, 13, 11, 10, that is of all parts up to the level of the lower face 9 of the foot 8 and with the exception of this lower face 9, respectively on either side of plane 7, in relation to which the faces 21 are mutually symmetrical. Opposite to this lower face 9, the two parts or upper halves 19 are complemented by a third part, or bottom part 22, with the general shape of a plate that is perpendicular to plane 7 and bounded upwards by a top face 23 shaped in a manner that will be detailed below, so as to lie along the lower face 9 of the foot 8 of the two rails in the neighbourhood of the end-pieces 3, as well as opposite to the corresponding zone of the space 4, and to connect, in the direction of a distancing in relation to plane 7, to the bottom limit of each of the faces 21 in order to delimit, with the latter, around the space 4 and a respective zone 24 of each rail 2, directly adjacent to its end-piece 3, a moulding die 25 that is closed in a sealed manner to the weld metal in the liquid state, with the exceptions which will be described below, by continuous contact of the faces 21, 23 against the two rails 2, in conditions which will be described below, in a zone 26 respectively of these rails 2 located longitudinally opposite to the corresponding end-piece 3 in relation to the aforementioned zone 24, housed inside the moulding die 25.

Each of the parts 19, 22 can also have any shape in the context of this present invention, this shape being a parallelepiped rectangle, for example, but preferably being formed by a top flat face 27 of each of the parts or upper halves 19, perpendicular to plane 18 and approximately perpendicular to plane 7, a top face 28 of the mould 6, suitable for directly accommodating the crucible 5 in accordance with the specifications of the aforementioned European patent of the Applicant. To this end, as described in this European patent to which reference will be made advantageously, the two faces 27 form between them a dihedral whose angle has a value other than 180° for the purpose of self-centering of the crucible 5, which is shaped in a complementary manner. These arrangements are well known in themselves, and will therefore not be described further here.

Also in a manner that is known in itself, each of the upper halves 19 of the mould 6 is hollowed out, at its faces 20, 27 as well as in an upper zone 30 of its face 21, corresponding to the upper or top face 16 of the head 14 of the rails 2 and to the corresponding zone of the space 4, by a half 29 respectively of a channel 32 for pouring of the weld metal in the liquid state, originating from the crucible 5, to the moulding die 25. With each of the halves 29 being approximately symmetrical in relation to plane 18, and these two halves 29 being mutually symmetrical in relation to plane 7, the channel 32 presents an overall symmetry in relation to an axis 33 formed by the intersection of these planes 18, 7, and thus opens out on this axis 33, firstly upwards at the top face 27 and secondly downwards in the zone 30 of the faces 21, via an upper 34 and lower 35 mouth-piece respectively, both on axis 33.

The conformation of the channel 32 remains identical, in a mould 6 according to the invention, to what it is in the moulds of prior art and will therefore not be detailed further. Advantageously, also known in itself, the halves 29 of the channel 32 are shaped so that it is able to receive and immobilize, at an intermediate level between the levels of the mouth-pieces 34, 35 respectively, an additional part or plug 36, created like parts 19 and 22 in a refractory material such as a bonded sand, to constitute, inside the channel 32, a chicane that is capable of preventing a direct fall of the weld metal in the liquid state, on axis 33 to the moulding die 25, and it is also intended that other arrangements could be chosen without going outside the bounds of this present invention.

Likewise, in a manner that is known in itself, each of the parts or upper halves 19 of the mould 6 is hollowed out, opposite to plane 7 in relation to the corresponding half 29 of the channel 32, respectively on an axis 37 located in this plane 18 but approaching plane 7 downwards, making a tubular pipe 38 which opens out firstly upwards, via a top mouth-piece 39, respectively in the top face 27 and secondly downwards, via a bottom mouth-piece 40, respectively in a zone 41 of the face 21 located opposite to a corresponding upper half or top face 11 of the foot 8. In addition, according to a preferred method of implementation, each of the pipes 38 opens out, at an intermediate level between the respective levels of its top mouth-piece 39 and its bottom mouth-piece 40, respectively in a zone 42 of the face 21 located opposite to one corresponding edge 17 of the head 14 respectively. To this end, on a same axis 43 perpendicular to plane 7 and located in a plane 44 that is perpendicular to planes 7 and 18, between each pipe 38 and the zone 42 of the face 21 of the same part or upper half 19, a tubular passage 45 is created that opens into the corresponding zone 42 via a mouth-piece 46, or lateral mouth-piece respectively.

These arrangements are also well-known to person skilled in the art and will not be described further. In general, the upper halves 19 and the bottom part 22 of the mould 6 according to the invention can also include other arrangements that are well-known in themselves, but optional in the context of this present invention, such as cut-outs 47 created in the upper face 27 in order to allow the removal of the corundum produced by the aluminothermic reaction, at the end of pouring the weld metal in the liquid state, from the flow passages 48 of the weld metal in the liquid state between each of the pipes 38 and the corresponding half 29 of the channel 32, at an intermediate level between the respective levels of the plug 36 and of the bottom mouth-piece 35 of the channel 32, in each of the upper halves 19, or again protuberances 49 projecting from the face 23 of the bottom part 22 in order to facilitate the mutual positioning of the three parts 19, 22 interlocking around the upper halves 19, respectively on either side of each in the direction of a distancing in relation to plane 18.

In the method of implementation of the mould 6 according to the invention which was illustrated in FIGS. 1 to 5, to which reference will now be made, the faces 21, 23, which form the moulding die 25, themselves retain their known conformation, according to which, in any cross-sectional plane, such as plane I-I, they present a contour that is complementary to that of the corresponding faces, half-faces or edges of a rail 2, augmented by a mutual play spacing which can vary on these faces, half-faces or edges on the one hand, and vary in a longitudinal direction so as to be weaker opposite to the zones 26 of the rails 2 than between these zones, namely opposite to zones 24 and around space 4, on the other hand.

Thus as far as the upper halves 19 of the mould 6 are concerned, the face 21 presents a concave section, defined by a concave surface part 51, presenting, for example, a more-or-less open, U-shaped contour, opposite to zones 24 of the rails 2 and around space 4, in zone 42, and this also applies in the other zones of the face 21, namely in the aforementioned zone 41, corresponding to the upper half or top face 11 of the foot 8 of the rail, a zone 53 located opposite to the corresponding edge 10, a zone 54 placed opposite to the corresponding lateral face 13 of the web 12, a zone 55 located opposite to the corresponding lower or bottom half-face 15 of the head 14 and a zone 56 corresponding to a marginal part, corresponding to this edge 17, of the upper or top face 16 of the head 14, bordering the bottom mouth-piece 35 of the channel 32 in the direction of a distancing in relation to plane 7.

The surface part 51, in this method of implementation, is symmetrical in relation to plane 18 and, in the direction of a distancing in relation to the latter, is connected by a respective edge 57, at an angle which can vary depending on the parts, to two other surface parts 52, each of which constitutes one part of a contact surface of the face 21 against the zone 26 of a corresponding rail 2 respectively. In their section, the surface parts 52 are rectilinear, perpendicular to plane 18 and collinear, and the surface part 51 forms between them a hollow that is more or less pronounced depending on the zones of the face 21. In the method of implementation of the mould 6 according to the invention illustrated in FIGS. 1 to 5, as in the moulds of prior art, the surface parts 52 are thus mutually symmetrical in relation to plane 18.

In a manner which is well known in itself, the surface parts 52 make contact continuously with the corresponding zone 26 of the rail 2, not directly but by means of a refractory lining 58, that is sufficiently compressible to optimally mate with the corresponding zone 26 and thus provide a seal around the die 25 in relation to a leakage of the weld metal in the liquid state.

However, in accordance with this present invention, this lining 58 is limited to the zones 63, 64, 65 and 66 of surface parts 52 which, like the zones 53, 41, 54 and 55 of surface parts 51, corresponding to the edges 10 and to the upper or top parts 11 of the foot 8 of the rails 2, to the sides 13 of their web 12 and to the lower or bottom half-faces 15 of the head 14 of the rails 2, while the rigid refractory material constituting the parts or halves 19 press directly against the sides 17 and the upper or top face 16 of the heads 14, in relation to which sealing of the weld metal in the liquid state is achieved by means of luting paste applied on site, in a manner that is known in itself, in zones 67 and 68 of the corresponding surface parts 52 respectively.

Likewise, the top face 23 of the bottom part 22 carries, in an attached manner, between the protuberances 49, a lining 59 that is similar in every respect to lining 58.

More precisely, the face 23 is flat, in the method of implementation of the mould 6 illustrated in FIGS. 1 to 5, as in the prior arts, and it has a flat peripheral surface part 60, which firstly presses against a flat shoulder 61, perpendicular to planes 18 and 7, and turned downwards, that each of the upper halves 19 presents, and which is connected to plane 7 at zone 53 of the corresponding face 21, and secondly against the lower face 9 of the foot 8 of the two rails 2, in the corresponding zone 26 respectively.

This plane peripheral part 60 completely surrounds a surface part 62, also flat, of the face 23, with this surface part 62 being placed opposite to the lower face 9 of the foot 8 of the two rails 2, in their zones 24, and of the space 4, below the latter, in order to delimit the die of the mould 25.

The lining 59 extends in a continuous manner over the whole of the surface part 60, all around the surface part 62, in order to achieve sealing of the contact with the lower face 9 of the two rails 2, in their zones 26, as well as with lining 58 of zone 53 of each face 21, with lining 59 preferably extending to between the peripheral part 60 of the face 23 and each of the shoulders 61.

The die 25 is thus closed in a sealed manner, in zones 63, 64, 65 and 66 of surface parts 52 and in the peripheral part 60 of the face 23, by the linings 58 and 59, whose compressibility provides a certain tolerance of positioning, in the direction of the height, in relation to the lower or bottom face 9, to the edges 10 and to the upper or top half-faces 11 of the foot 8 of each of the rails 2, and in relation to the sides 13 of their web and to the lower half-faces 15 of their head, while achieving the required sealing effect in relation to passage of the weld metal in the liquid state.

Figure 1:
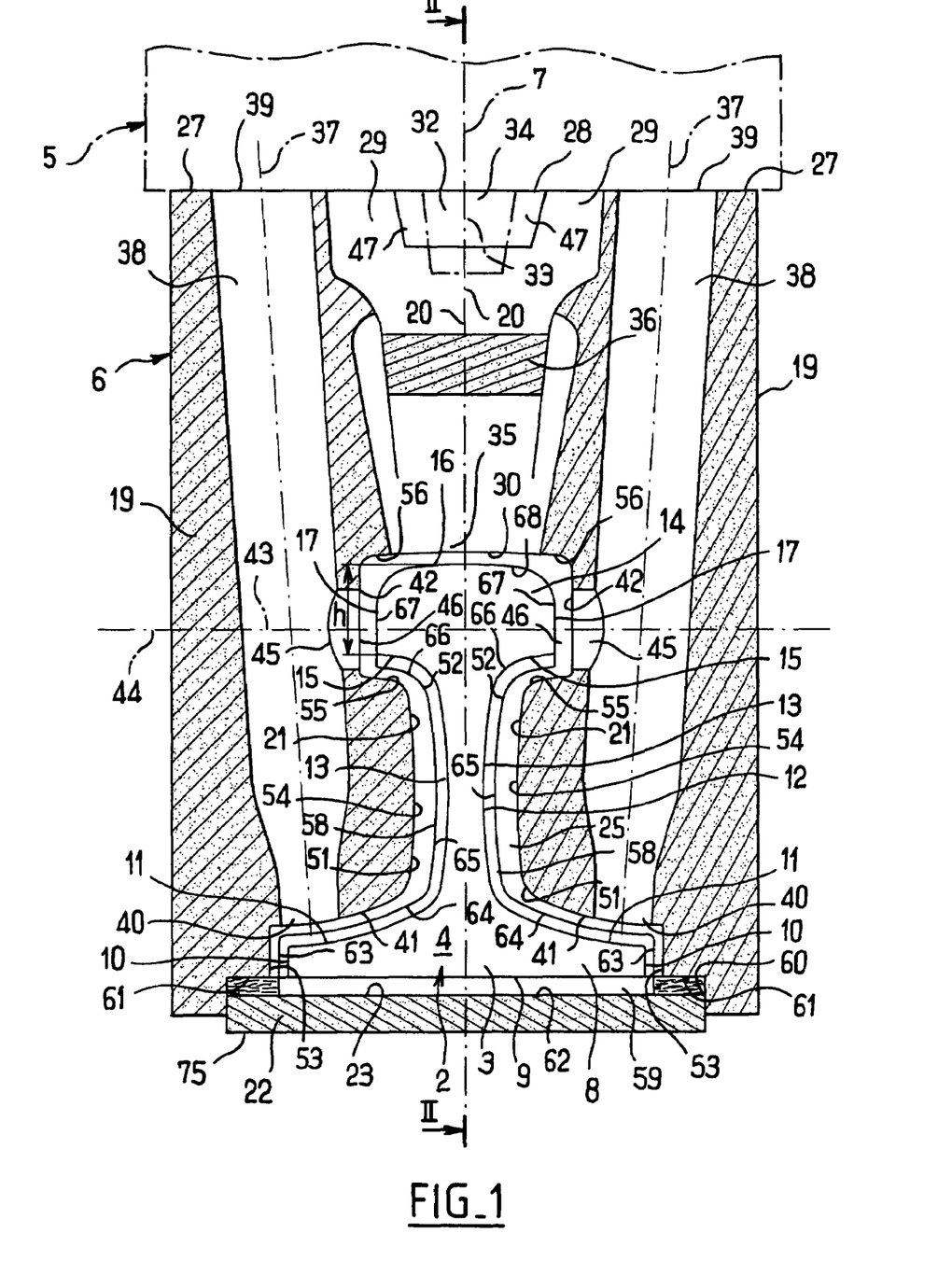
FIG. 1 shows a view of a mould according to the invention, more particularly designed for the welding of rails whose heads, worn to varying degrees, up to a limit of 15 millimeters for example in the direction of the height, present a relatively low wear difference, up to a maximum of 3 millimeters for example, in the direction of the height, where this mould has three parts, according to the method of implementation currently preferred, directly inspired in this regard by the method of implementation of moulds of prior art, and shown here in the assembled state on the end-pieces of two railway rails to be welded together, and in section by a transverse plane of symmetry between these two end-pieces, as shown by the markers I-I in FIG. 2.
Figure 2:
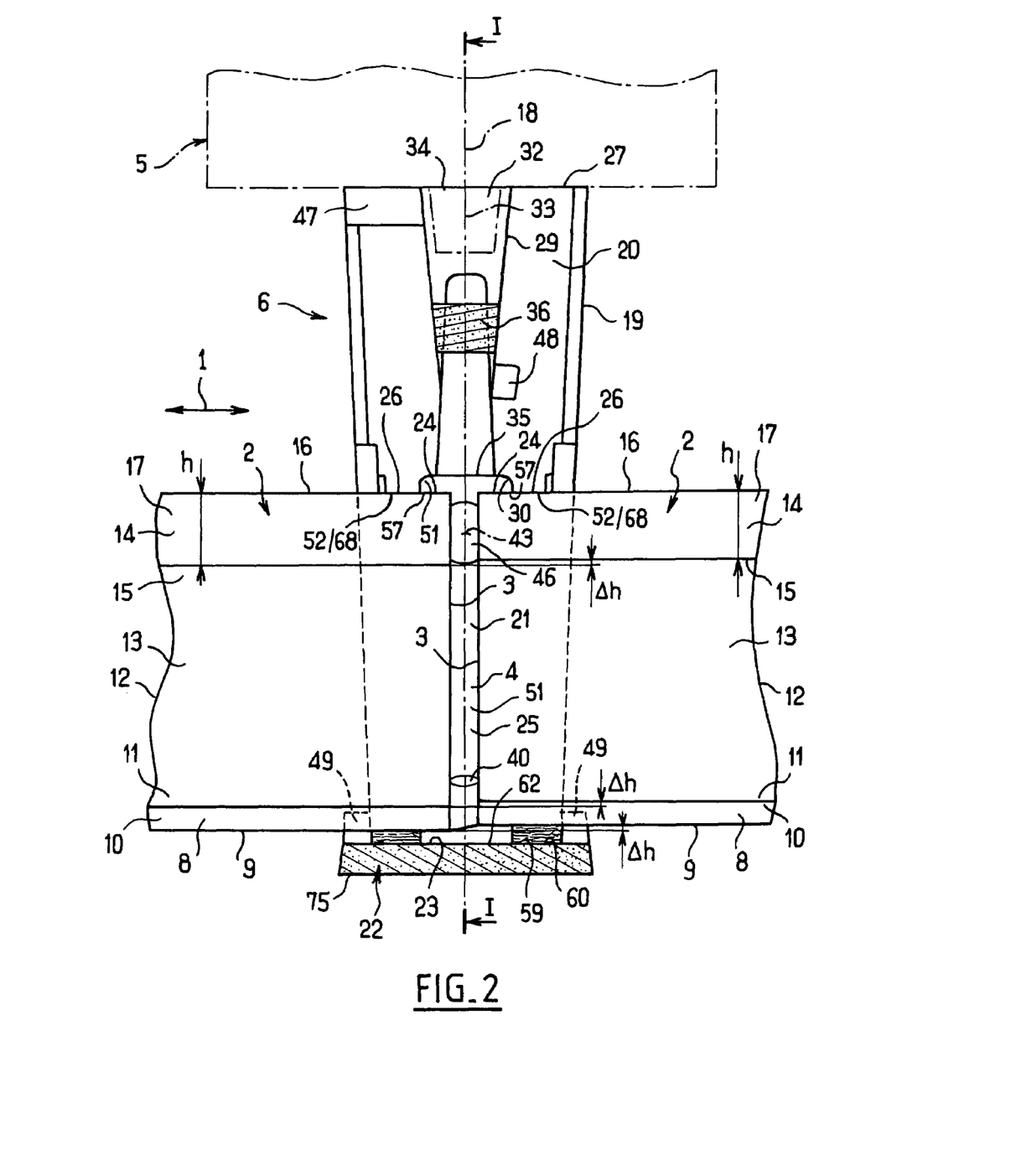
FIG. 2 shows a view of this mould in section by a longitudinal plane of symmetry common to the two rails, for their part shown in elevation, and marked II-II in FIG. 1.

Thus, by way of a non-limiting example, for a value of the order of 5 millimeters of the thickness e of the linings 58, 59 considered at rest, that is in the uncompressed state, it is possible to allow, without loss of the seal, an offset Δh that can be up to 3 millimeters, in the direction of the height, between the lower or bottom face 9 of the foot 8 of one of the rails 2 and the lower face 9 of the foot 8 of the other rail 2, which is matched by an identical offset Δh of the sides 13 of their web 12 and of the lower or bottom half-faces 15 of their head 14, in order to compensate for a difference of the same value Δh between the values of the respective heights h of the two heads 14, because of a wear difference on these heads 14, so as to retain a longitudinal alignment of their two upper faces 16, as has been illustrated in FIG. 2.

To the extent that, as is already known, the wear on the head 14 of the rails 2 generally results in only a very small reduction in the dimensions that it presents between its edges 17, perpendicularly to plane 7, a suitable dimensioning, in terms of offset, between the geometrical plane of the faces 20 of the upper halves 19 of the mould 6 and zones 67 of the surface parts 52 during the manufacture of these upper halves 19 and an appropriate care devoted to luting that is employed in order to achieve a seal at the level of these zones 67 and the edges 17 of the head 14 of the two rails 2 in all of the wear conditions generally accepted for the latter, without which it would be necessary to re-work the upper halves 19 of the mould 6 in this regard at the welding site.

On the other hand, the mould 6 according to this present invention, in particular regarding its method of implementation illustrated in FIGS. 1 to 5, presents arrangements that allow its geometry to be adapted to meet requirements in terms of height h of the head 14 of each of the rails 2, so that this height h should be identical, in a manner that is not illustrated, or offset by $\Delta h$ as has been illustrated, by selective removal of all or part of an excess of material constituting each upper half 19 of the mould 6, designed for this purpose, during the manufacture of this half 19 of the mould, in localised zones of the latter which are intended to constitute a half of each of the zones 68 respectively.

Figure 3:
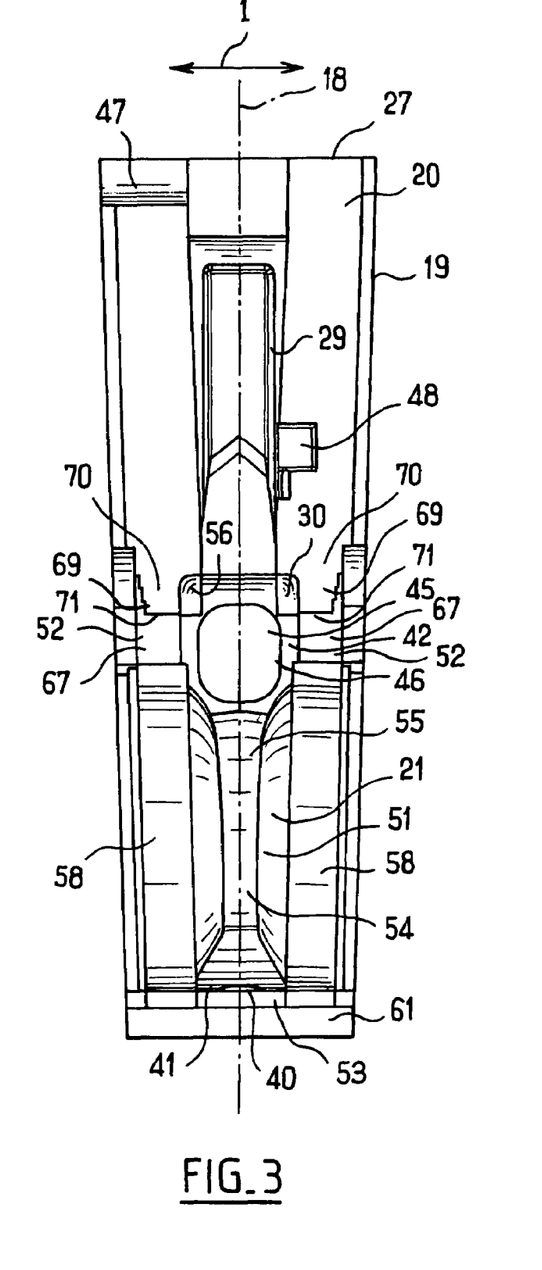
FIG. 3 shows, in a view in elevation similar to that of FIG. 2, one of the two constituent parts in this method of implementation of the upper halves of the mould.
Figure 4:
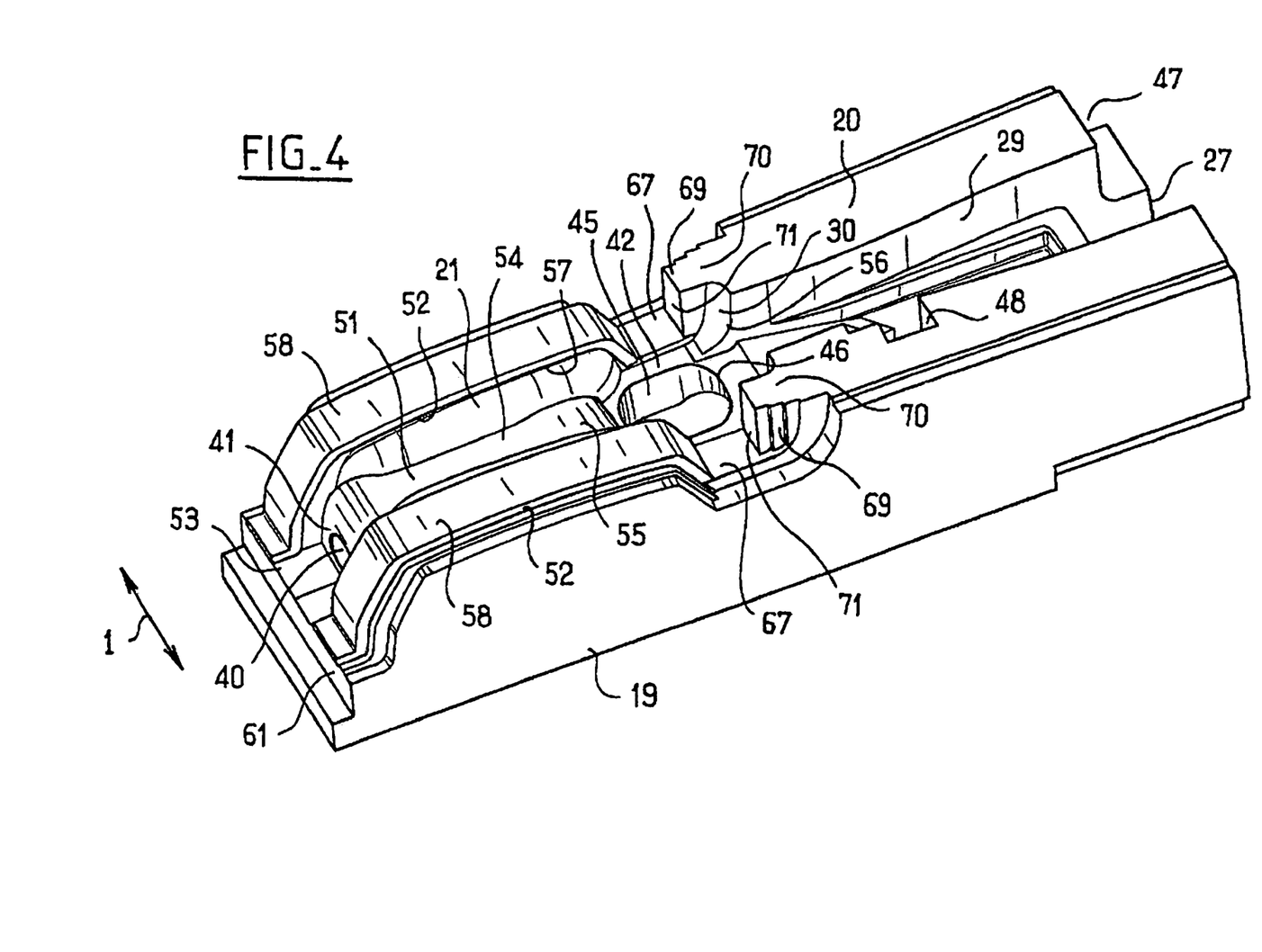
FIGS. 4 and 5 show views in perspective of the same part of the mould, respectively as a whole from one side of this part and in magnified detail from the opposite side of the latter.
Figure 5:
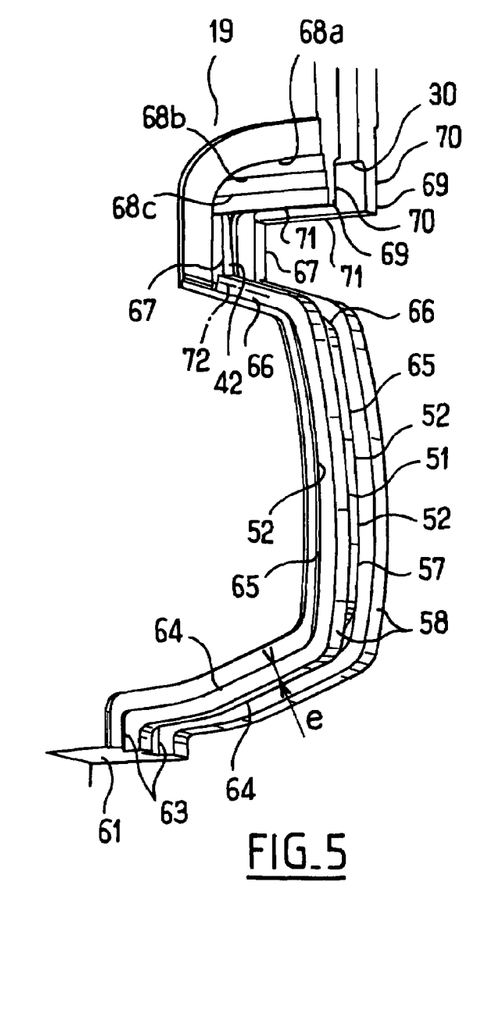

FIGS. 3 to 5 show an upper half 19 of the mould as it emerges from manufacture and as it is presented before adaptation, on site, to two rails 2 to be welded together.

It emerges that this half 19, like the other half 19, presents the definitive conformation of its faces 20, of the entirety of its surface parts 51 intended to delimit a part of the moulding die 25 and of the zones 63, 64, 65, 66 of its surface parts 52, where these zones 63, 64, 65, 66 carry, in an attached manner, the corresponding compressible sealing lining 58, and that a part, adjacent to each zone 66 of the corresponding zone 67 respectively presents its definitive flat conformation, parallel to the geometrical plane of the face 20. On the other hand, if one considers a theoretical zone 68a, each surface part 52 which would correspond to a zone 68 that is adapted, by complementarity of shape, to the upper or top face 16 of the head 14 of a new rail, presenting the maximum possible value of h, the illustrated half 19 of the mould 6, like the other half 19 not illustrated in the new state, has projecting below this zone 68a, to the corresponding zone 66 respectively, a flat flashing 69, parallel to plane 18 in relation to which the two flashings 69 are mutually symmetrical so as to delimit between them an extension, which is not referenced, of the corresponding half 29 of the pouring channel 32, each of the flashings 69 being created as a single part with the corresponding half 19 of the mould 6, in the same rigid refractory material, such as a bonded sand.

Each of the flashings 69 is thus delimited by a respective coplanar extension 70 of the face 20 and, toward the corresponding zone 66 respectively, by one plane edge 71 respectively, perpendicular to planes 7 and 18, the two edges 71 being mutually coplanar and presenting the same spacing $h_{min}$ in the direction of the height, parallel to plane 7, in relation to the connection 72 of the lining 58, considered at the maximum compressed state in normal conditions of use, as has been shown with a mixed broken line in FIG. 5, with the corresponding zone 67. This spacing $h_{min}$ is at most equal to, meaning preferably slightly smaller than, the smallest possible value of h, in the acceptable wear conditions of the head 14 of a rail 2.

Preferably, perpendicularly to plane 18, the flashings 69 present a thickness, not referenced, of less than that of the neighbouring parts of the corresponding half 19 of the mould 6, so as to constitute a mechanical weakening allowing the easy removal, with a file for example, of a quantity of material that is just sufficient to create, with the required geometry, the zone 68 that is intended to fit onto the upper or top face 16 of the head 14 of a rail presenting a given value of h because of wear.

In order to facilitate this removal of material, and to increase its precision, the thinning of the flashings 69, in relation to the neighbouring parts of the half 19 of corresponding mould 6, is effected in steps, progressively, to the corresponding edge 71. Thus, as shown particularly in FIG. 5, and while each flashing 69 is preferably delimited to plane 18 by a respective face, not referenced, that is flat and parallel to the latter, each flashing 69 is delimited, in the direction of a distancing in relation to plane 18, by another face respectively, also not referenced, composed in this example of three plane strips, parallel to plane 18 and forming at their connection two steps 68b, 68c corresponding to two favoured positions of zone 68 to be created, with zone 68a itself being created in a third step. In the example illustrated, steps 68b and 68c are parallel to the edge 71 and their connections with the extension 70 of the face 20 of the half 19 of the mould are equally divided, in the direction of the height, between the connection of the zone 68a to the face 20 and the edge 71, but other conformations and other arrangements can naturally be chosen without going outside of this present invention.

Person skilled in the art will easily understand how one uses a mould 6 according to the invention in accordance with the method of implementation has just been described with reference to FIGS. 1 to 5.

After leveling the end-pieces 3, mutually aligned the upper or top faces 16 of the two heads 14 and suitably secured their feet 8, and after checking whether the offset $\Delta h$, at the level of the latter for example, is compatible with the use of a mould 6 according to this method of implementation, or again after observing that due to an identity of wear on the heads 14 and on the two rails 2, this offset $\Delta h$ is zero, one removes from each of the flashings 69 the quantity of material constituting each upper half 19 of the mould that is just necessary to create the required zone 68 of each surface part 52, conferring upon this zone 68 a geometry that is as complementary as possible to that of one half of the top 16 of the head 14 of a rail 2 and the part of each edge 17 that is closest to it, and then one puts in place, in the traditional manner on the two rails 2, the two top mould halves 19 and the bottom part 22, which is attached in the traditional manner. If the value of $\Delta h$ is other than 0, the linings 58, 59 are compressed differently opposite to one or other of the rails 2 while still providing a continuous mutual seal in relation to the weld metal in the liquid state, in zones 60, 63, 64, 65, and 66, in relation to the foot 8, of the web 12 and of the lower or bottom half-faces 15 of the head 14. In the absence of any wear difference $\Delta h$, that is of any offset, for example, between the lower faces 9 of the feet 8 of the two rails 2, the linings 58, 59 are compressed in an identical manner and provide the seal identically in the same zones 60, 63, 64, 65, and 66. In both cases, this seal can then be completed by a luting process, which, on the other hand, alone provides the seal between each of zones 67 and 68 and the head 14 of the rails 2.

The pouring of the weld metal in the liquid state can then be effected in the usual conditions, from the crucible 5 advantageously placed directly on the top face 28 of the mould 6, and then all of the crucible and of the mould 6 can be removed by destruction in the conditions described in the aforementioned European patent of the Applicant, or indeed in any other way that is known in itself.

Person skilled in the art will easily understand that the presence of the flashings 69 corresponding to an excess of material constituting each upper half 19 of the mould 6 allows one, by appropriate dimensioning in the direction of the height, to cope with any acceptable value of h, that is any acceptable wear of the heads 14, as long as the wear difference Δh remains sufficiently small to be absorbed, without losing the seal, by a difference of compression linings 58, 59 on either side of plane 18 respectively.

On the other hand, the method of implementation of a mould 6 as has just been described cannot used if the wear difference Δh exceeds a maximum value that is compatible with such an absorption by difference of compression linings 58, 59 respectively on either side of plane 18.

Provision has therefore been made for a second method of implementation of a mould 6 according to the invention, which will now be described, in order to deal with the situations in which the value of Δh exceeds this threshold.

This second method of implementation will now be described, with reference to FIGS. 6 to 9 in which, for reasons of simplicity and because of considerable similarities with the method of implementation described with reference to FIGS. 1 to 5, the same number references have been retained.

Because of these great similarities, we will describe with reference to FIGS. 6 to 9 only the differences between this method of implementation and that which was described with reference to FIGS. 1 to 5, and reference will be made to the description of these FIGS. 1 to 5 for the common points.

The elements that are identical include in particular, with the same relations and mutually symmetrical or respective in relation to plane 7 and 18, the faces 20, 27 of the upper halves 19 of the mould 6, the corresponding halves respectively 29 of the channel 32, the corresponding pipes 38 respectively, the accessory arrangements such as the cut-outs 47 and the passages 48, the plug 36 and anything concerning the characteristic arrangements of this present invention, the flashings 69 which in this case retain their mutual symmetry in relation to plane 18.

Also identical or substantially identical, with their mutual symmetry in relation to the two plans 7 and 18, are the surface parts 51 of the faces 21 of the halves 19 of the mould 6, whose surface parts 52 here retain their symmetry only in relation to plane 7, of either of the halves 19 of the mould 6.

In fact, while preserving a conformation that is identical to that which was described with reference to FIGS. 1 to 5, that is a conformation which is suitable for that of the profile of a rail 2 as it is defined by one edge 10 and the corresponding half-top or top face 11 of the foot 8, the corresponding side 13 of the web 12 and the corresponding lower or bottom half-face 15 of the head 14, and by identically preserving the lining 58, the surface parts 52 located on one side of plane 18 are offset, exclusively in the direction of the height, in relation to the surface parts 52 located on the other side of this plane 18, by a value H which is advantageously equal to or slightly greater than the maximum value of Δh that is allowable with a mould created in accordance with the method described with reference to FIGS. 1 to 5. In relation with the numerical values indicated by way of a non-limiting example in relation to the method of implementation described with reference to FIGS. 1 to 5, namely for a maximum value of three millimeters of Δh, H can, for example, have a value of the order of four millimeters.

This offset H in the direction of the height is manifested by a slight difference, which is not significant and so not detailed here, in the form of the connection of each surface part 51 to the corresponding surface parts 52 and by the presence of a step 67, on plane 18, in each of the shoulders 61 which remain flat and perpendicular to this plane 18, as well as to plane 7, respectively on either side of plane 18.

In these conditions, as will be understood by person skilled in the art, once the alignment has been effected between the upper or top faces 16 of the heads 14 of two rails 2 to be welded together, presenting a wear difference Δh at least equal to H and capable of being greater than H, of a value that can be up to the maximum value allowable for Δh in the case of the method of implementation described with reference to FIGS. 1 to 5, the compressible sealing linings 57 can adapt to the edges 10, to the upper or top half-faces 11 of the foot 8 of the two rails, to the sides 13 of their web 12 and to the lower or bottom half-faces 15 of their head 14 in order to create a seal in relation to the weld metal in the liquid state, in conditions similar to those which have been described with reference to FIGS. 1 to 5.

In order to adapt to the differences of level that then exist between the lower faces 9 of the two feet 8 as well as to the steps 7, by means of the lining 59, the top face 23 of the bottom plate 22 is no longer flat but, while remaining symmetrical in relation to plane 7, presents an asymmetry in relation to plane 18 so as to present respectively on either side of the latter, in particular in its peripheral zone 60 dividing the lining 59, two flat parts 72 and 73 which are both perpendicular to the two planes 7 and 18 but whose second is shifted upwards, in relation to the first, by the value H and connected to the first by a part 74 which obliquely cuts plane 18 so as to connect, without any sharp transition, to both of these parts 68 and 69.

Naturally, the lining 59 also applies to this part 74 and, as a result of its compressibility, provides a sealed contact with the lower faces of the two feet 8, ad with the shoulders 61, including at the level of their step 67.

Figure 6:
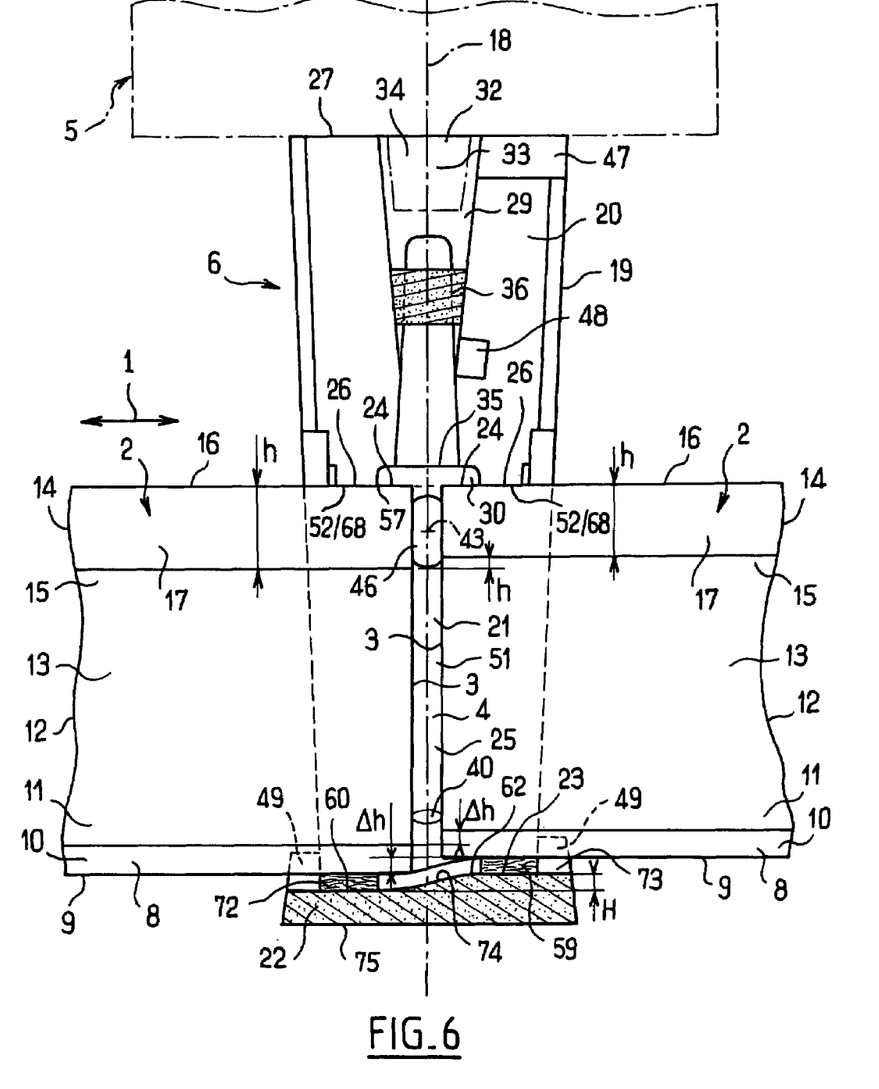
FIG. 6 illustrates, in a view in section similar to that of FIG. 2, a mould according to the invention that also has three parts, but which is more particularly designed for the welding of rails whose heads, worn to varying degrees, for example up to the aforementioned limit of 15 millimeters in the direction of the height, present a relatively large wear difference, of the order of 3 to 7 millimeters for example, in the direction of the height.
Figure 7:
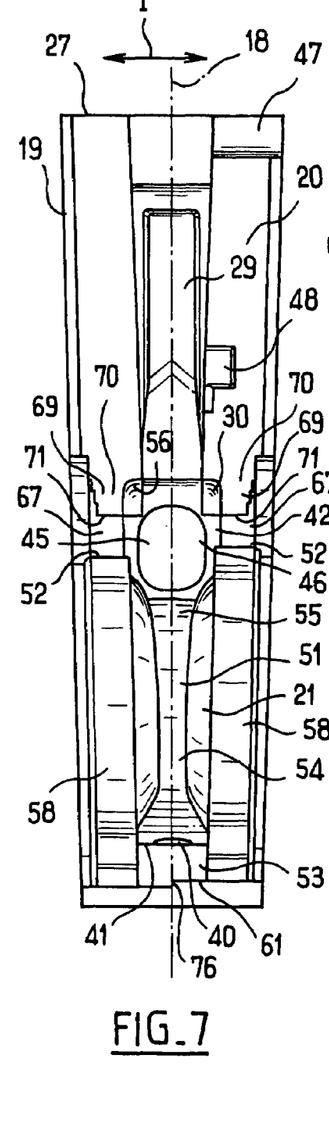
FIG. 7 shows, in a view in elevation similar to that of FIG. 6, one of the two constituent parts in this method of implementation of the upper halves of the mould.
Figure 8:
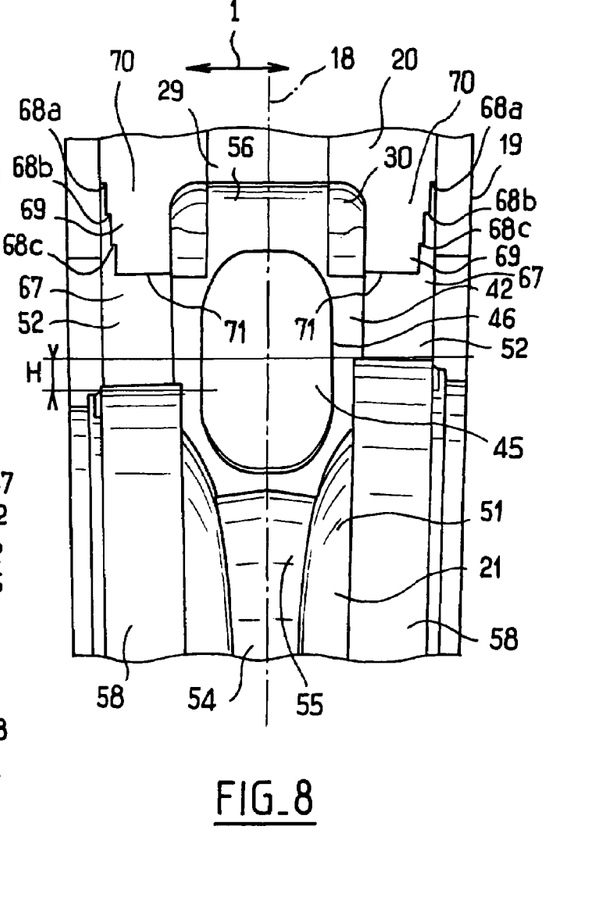
FIG. 8 shows a central detail of FIG. 7, on a larger scale.
Figure 9:
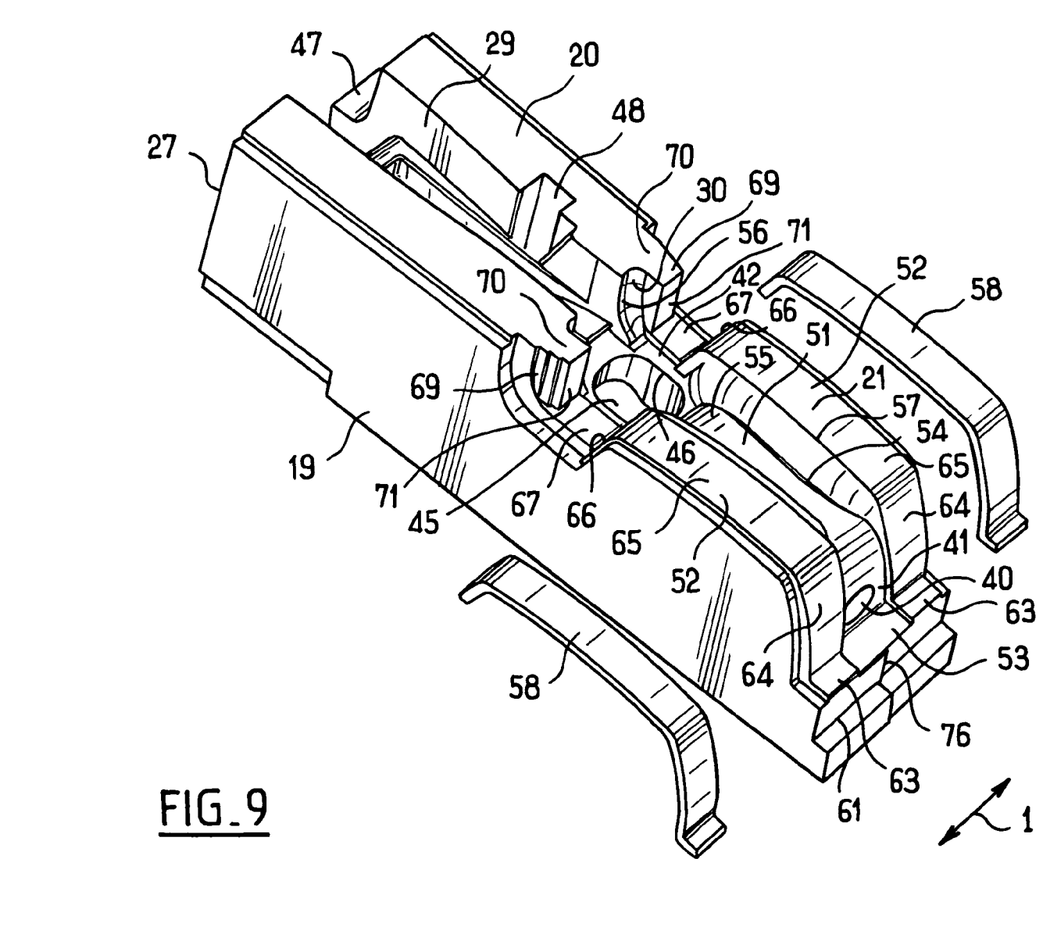
FIG. 9 shows an exploded view, in perspective, of the same part of the mould.

It will be remarked that, by being applied against the shoulders 61 respectively on either side of the step 67, by means of the lining 59, the parts 72, 73, by their offset in the direction of the height, compensate for the mutual offset of the two parts of each shoulder 61 in this same direction and that, when the bottom plate 22 presents a flat lower face 75, perpendicular to the two planes 18 and 7, this lower face 75 can have a positioning that is identical in every way to the case of the method of implementation of the mould 6 according to the invention that has just been described with reference to FIGS. 6 to 8, and in the case of the method of implementation described with reference to FIGS. 1 to 5, which allows one to use the same chassis in order to hold the component parts 19, 22 of these moulds, whatever their method of implementation.

With reference to the numerical values indicated by way of a non-limiting example in relation to these two methods of implementation of a mould according to the invention, while the method of implementation described with reference to FIGS. 1 to 5 can adapt to the rails 2 whose heads 14 present a maximum wear of the order of 15 millimeters in the direction of the height, with a difference Δh of head height at most equal to three millimeters, the method of implementation described with reference to FIGS. 6 to 8 can adapt without difficulty to the rails 2 whose head 14 presents a wear that can go up to 15 millimeters, with a difference Δh of head height ranging from 4 to 7 millimeters.

These examples are not limiting in any way however, and one does not move outside the scope of this present invention by creating, in accordance with the latter, moulds that can be adapted, in particular, for levels of wear that are greater or differences of wear that are greater.

Moreover, person skilled in the art will easily understand that the advantages that arise from the characteristics according to this present invention can also be found in the case of the welding of rails with a profile other than the "Vignoles" type that has been illustrated, and in the case of moulds of a design that is different from the design in three parts which has just been described, and person skilled in the art will be able to adapt to each case the arrangements that have just been be described, without encountering any difficulty and without moving outside the scope of this present invention.

The invention claimed is:

1. A mould for the aluminothermic welding of railway rails (2) that are aligned with each other longitudinally, of the type that includes several parts (19, 22) in rigid refractory material, that is suitable to be assembled temporarily around transverse end-pieces (3) of rail (2) to be welded, which together form:

a moulding die (25), open upwards, arranged to receive poured welding metal in the liquid state, and enveloping the two end-pieces (3), a space(4) created between them, and a first zone (24) of each rail (2), immediately adjacent to the corresponding end-piece (3), in order to communicate a given shape to the weld metal as its solidifies, two continuous surfaces (60, 63 to 68, 71) arranged to make contact with a second zone (26) of each rail (2) immediately adjacent to the first zone (24) of the latter, opposite to the corresponding end-piece (3) in relation to this first zone (24), and carrying an attached compressible lining (58, 59) in order create a contact seal in relation to the weld metal in the liquid state, characterised in that the said compressible lining (58, 59) is limited to the parts (60, 63, 64, 65, 66) of each contact surface corresponding to the bottom (9), the sides (10) and the top (11) of a foot (8) of the corresponding rail (2), to the sides (13) of a web (12) of the corresponding rail (2) and to the bottom (15) of a head (14) of the corresponding rail (2), in that the said rigid refractory material is directly exposed in parts (67, 68, 71) of each contact surface corresponding to the sides (17) and to the top (16) of the head (14) of the corresponding rail (2), in that each contact surface presents, between its part (68, 71) corresponding to the top (16) of the head (14) of the corresponding rail (2) and the said compressible lining (58) of its part (66) corresponding to the bottom (15) of the head (14) of the corresponding rail (2), at the maximum compressed state with reference to the normal conditions of use, a spacing which is less than the spacing (h) between the top (16) and the bottom (15) of the head of a new rail (2), and in that the said rigid refractory material is chosen or treated in order to facilitate its selective removal at least in the parts (68, 71) of each contact surface corresponding to the top (16) of the head (14) of the corresponding rail (2) and thus to allow adaptation of the mould (6) to the rails (2) whose head (14) is worn, with continuous contact of the said contact surface (60, 63 to 68, 71) at the bottom (9), the sides (10) and the top (11) of the foot (8) of the two rails (2), at the sides (13) of the web (12) of the two rails (2) and at the bottom (15), the sides (17) and the top (16) of the head (14) of the two rails (2).

2. A mould according to claim 1, characterised in that it presents a localised slimming down of each contact surface in its part (68, 71) corresponding to the top (16) of the head of the corresponding rail (2).

3. A mould according to either of claims 1 and 2, characterised in that it includes the markers (68*a*, 68*b*, 68*c*) for selective removal along the parts (68, 71) of each contact surface corresponding to the top (16) of the head (14) of the corresponding rail (2).

4. A mould according to claim 3, characterised in that the said markers (68*a*, 68*b*, 68*c*) are composed of steps (68*a*, 68*b*, 68*c*) in the said localised slimming down area.

5. A mould according to claim 1 characterised in that the two contact surfaces (60, 63 to 68, 71) are mutually symmetrical in relation to a plane (18) that is intended to coincide at least approximately with a transverse mean plane of symmetry (18) between the two rail end-pieces (3).

6. A mould according to claim 1 characterised in that the parts (67, 68, 71) of the two contact surfaces corresponding to the top (16) and to the sides (17) of the head (14) of the rails (2) are mutually symmetrical in relation to a plane (18) that is intended to coincide at least approximately with a transverse mean plane of symmetry (18) between the two rail end-pieces (3), and in that the parts (60, 63, 64, 65, 66) of the contact surfaces corresponding to the bottom (9), to the sides (10) and to the top (11) of the foot (8), to the sides (13) of the web (12) and to the bottom (15) of the head (14), respectively on either side of the said plane (18), are mutually asymmetrical in relation to the latter, by a difference (H) of spacing in relation to the part (68, 71) of the respective contact surface corresponding to the top (16) of the head (14) of the corresponding rail (2).

7. A mould according to claim 1 characterised in that the said parts (19, 22) include two parts (19) intended to be placed respectively on either side of each rail (2), mutually symmetrical in relation to a plane (7) that is intended to coincide at least approximately with a mean longitudinal plane of symmetry (7) respectively of the two rail end-pieces (3) and respectively constitute parts (63 to 68 and 71) of the said surfaces corresponding to the sides and to the top (4) of the foot (8) of the rails (2), to the sides (13) of the web (12), and to the bottom (15), the sides (17) and the top (16) of the head (14) of the rails (2).

8. A mould according to claim 7, characterised in that the said parts (19, 22) include a third part (22), that is intended to be placed below each rail (2) and constitute parts of the said surfaces (60, 63 to 68 and 71) corresponding to the bottom (9) of the foot (8) of the rails (2).

9. A mould according to claim 1 characterised in that the compressible lining (58, 59) includes a felt of refractory fibres (19, 22) linked by a refractory binder, affixed to the said parts by means of a refractory adhesive.

10. A mould according to claim 1 characterised in that rigid refractory material is a bonded sand.

* * * * *